(12) United States Patent
Chia et al.

(10) Patent No.: US 10,901,158 B1
(45) Date of Patent: Jan. 26, 2021

(54) OPTICAL FIBER ARRAY DEVICE AND OPTICAL FIBER ARRAY

(71) Applicant: Fujin Precision Industrial (Jincheng)Co.,Ltd., Jincheng (CN)

(72) Inventors: Shin-Lo Chia, Fremont, CA (US); Qin-Guo Fan, Jincheng (CN); Ke-Jun Yang, Jincheng (CN); Jin-Gang Bai, Jincheng (CN)

(73) Assignee: Fujin Precision Industrial (Jincheng)Co., Ltd., Jincheng (CN)

( * ) Notice: Subject to any disclaimer, the term of this patent is extended or adjusted under 35 U.S.C. 154(b) by 0 days.

(21) Appl. No.: 16/671,665

(22) Filed: Nov. 1, 2019

(30) Foreign Application Priority Data

Sep. 10, 2019 (CN) .......................... 2019 1 0854995

(51) Int. Cl.
*G02B 6/38* (2006.01)
(52) U.S. Cl.
CPC ......... *G02B 6/3881* (2013.01); *G02B 6/3854* (2013.01)

(58) Field of Classification Search
CPC ............................ G02B 6/3881; G02B 6/3854
USPC .......................................................... 385/78
See application file for complete search history.

(56) References Cited

U.S. PATENT DOCUMENTS

| 2003/0123837 A1* | 7/2003 | Yamamoto | G02B 6/3644 385/137 |
| 2005/0069265 A1* | 3/2005 | Lange | G02B 6/3885 385/63 |

* cited by examiner

*Primary Examiner* — Jerry M Blevins
(74) *Attorney, Agent, or Firm* — ScienBiziP, P.C.

(57) ABSTRACT

An optical fiber array device includes a substrate, a cover plate, and a ceramic ferrule array. A receiving groove is defined in one surface of the substrate. The substrate and the cover plate are coupled together and cover the receiving groove. The receiving groove includes a first groove wall and a second groove wall. The ceramic ferrule array includes at least one layer of ceramic ferrules and a number of positioning members. Opposite sides of the at least one layer of ceramic ferrules respectively abut the first groove wall and the second groove wall. Each of the positioning members is located between two adjacent ceramic ferrules.

19 Claims, 3 Drawing Sheets

OPTICAL FIBER ARRAY DEVICE AND OPTICAL FIBER ARRAY

FIELD

The subject matter herein generally relates to optical fiber array devices and an optical fiber array.

BACKGROUND

Generally, optical fiber array devices includes a plurality of optical fibers. However, in the related art, a positional accuracy of the optical fibers may be lower than desired.

BRIEF DESCRIPTION OF THE DRAWINGS

Implementations of the present disclosure will now be described, by way of embodiments, with reference to the attached figures.

DETAILED DESCRIPTION

Figure 1:
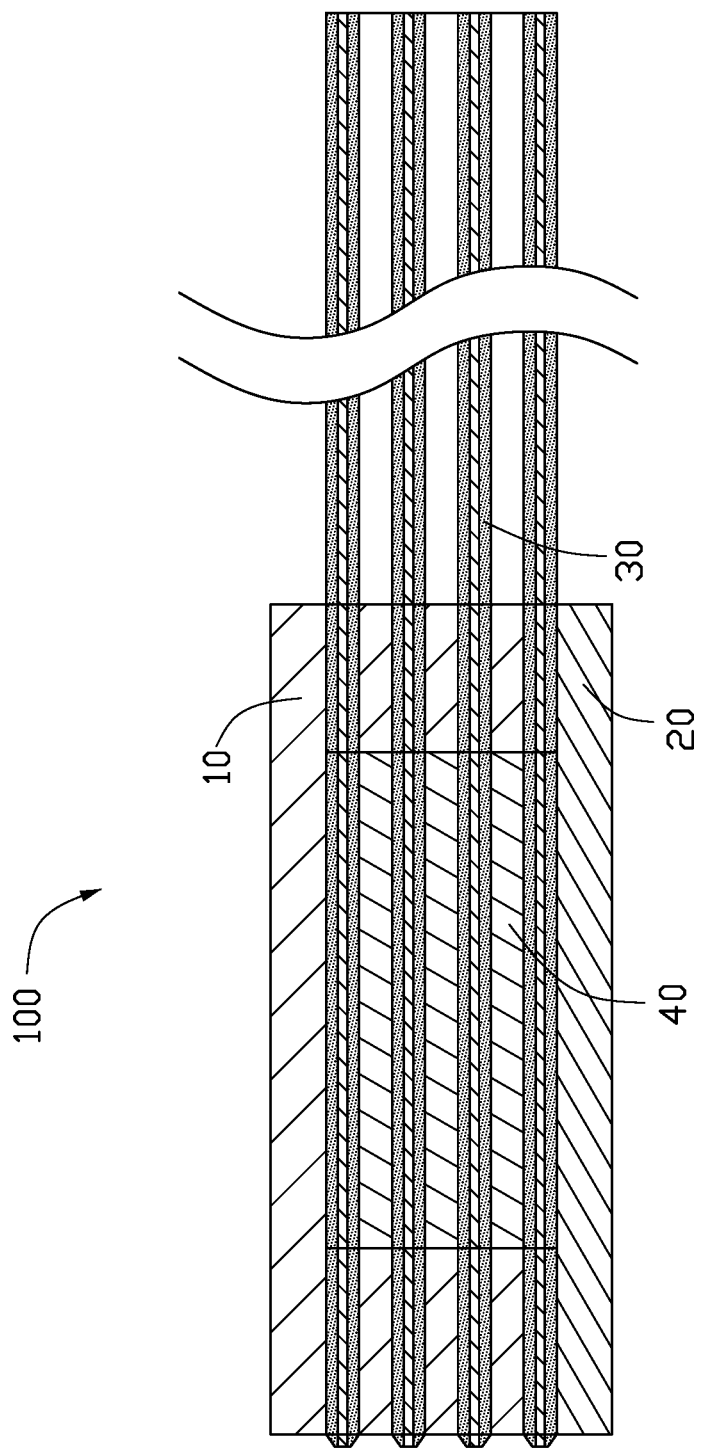
FIG. 1 is a diagrammatic view of an embodiment of an optical fiber array device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
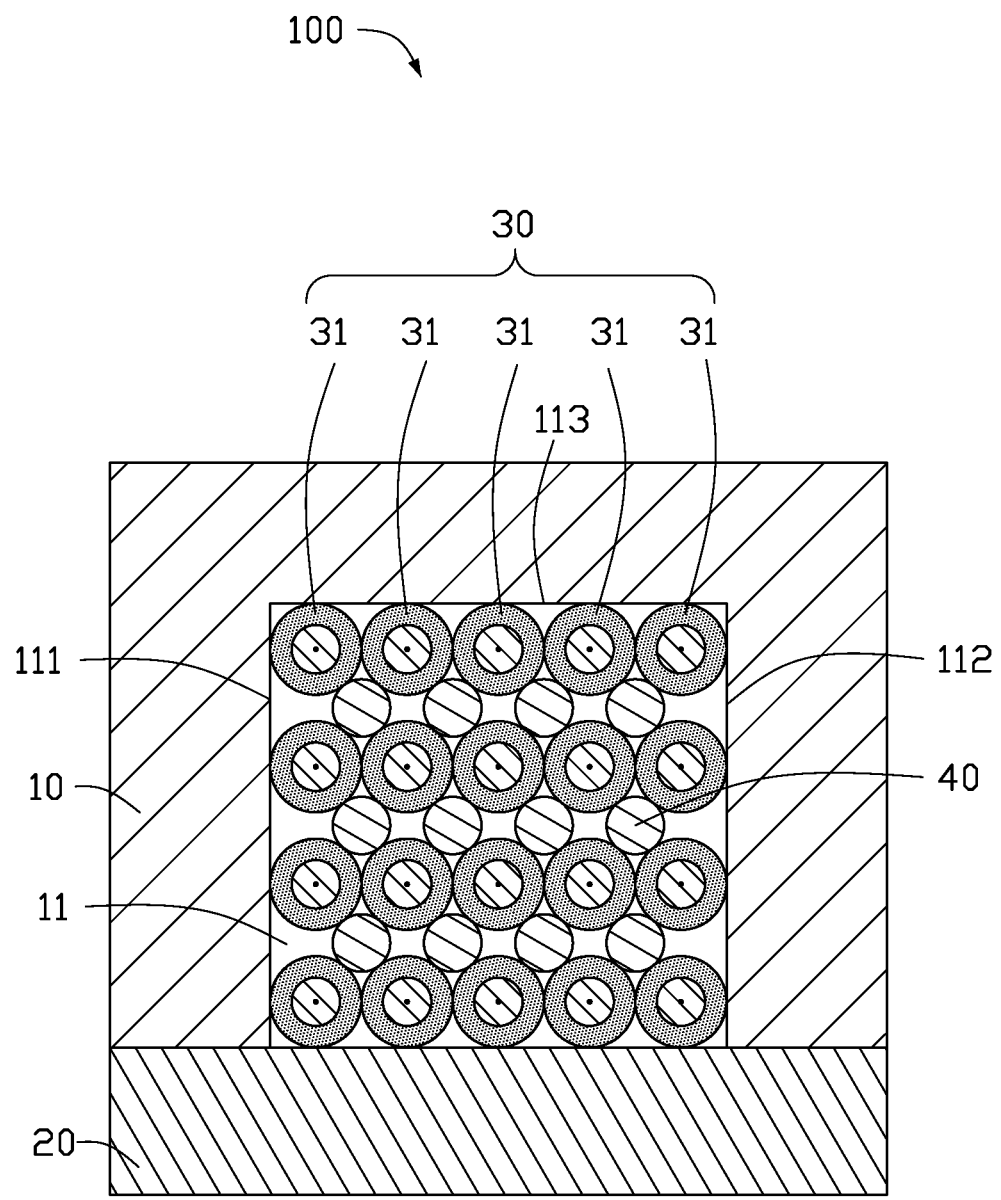
FIG. 2 is a cross-sectional view of the optical fiber array device in FIG. 1.

FIG. 1 and FIG. 2 show an embodiment of an optical fiber array device 100 for fixing a fiber optic cable. The optical fiber array device 100 includes a substrate 10, a cover plate 20, a ceramic ferrule array 30, and a plurality of positioning members 40. In one embodiment, the fiber optic cable is fixedly inserted into the ceramic ferrule array 30.

Referring to FIG. 2, a receiving groove 11 is defined in one surface of the substrate 10. The cover plate 20 is connected to the substrate 10 and covers the receiving groove 11. The receiving groove 11 includes a first groove wall 111 and a second groove wall 112 oppositely facing the first groove wall 111. The ceramic ferrule array 30 includes at least one ceramic ferrule layer. Opposite sides of the ceramic ferrule layer respectively abut the first groove wall 111 and the second groove wall 112. Each ceramic ferrule layer includes a plurality of ceramic ferrules 31. A cross-section of each ceramic ferrule 31 is substantially round. The positioning members 40 are located between adjacent two ceramic ferrule layers of the ceramic ferrule array 30.

The substrate 10 has a substantially rectangular cross-sectional shape. The cover plate 20 has a substantially rectangular cross-sectional shape.

The ceramic ferrule layers of the ceramic ferrule array 30 are stacked in the receiving groove 11. The receiving groove 11 has a substantially rectangular cross-section. The receiving groove 11 further includes a bottom wall 113 perpendicularly connected to the first groove wall 111 and the second groove wall 112. One of the plurality of ceramic ferrule layers abuts against the bottom wall 113, and another one of the plurality of ceramic ferrule layers abuts against the cover plate 20.

In one embodiment, a center of each ceramic ferrule 31 in each ceramic ferrule layer is aligned with a center of at least one ceramic ferrule 31 in another ceramic ferrule layer.

In one embodiment, a gap exists between adjacent ceramic ferrule layers, and a size of the gap is set according to a size of the positioning members 40. When an outer diameter of the ceramic ferrule 31 in the ceramic ferrule layer is changed, a pitch of an optical fiber cable inserted into the ceramic ferrule 31 correspondingly changes. It should be understood that a size of the positioning member 40 and the outer diameter of the ceramic ferrule 31 can be adjusted according to actual needs to adjust the gap between the adjacent ceramic ferrule layers and adjust a spacing of the fiber optic cables inserted into the ceramic ferrules 31.

In one embodiment, each ceramic ferrule 31 in each ceramic ferrule layer 30 abuts against an adjacent ceramic ferrule 31.

In one embodiment, the ceramic ferrule array 30 includes four ceramic ferrule layers, and each ceramic ferrule layer includes five ceramic ferrules 31. In other embodiments, a quantity of the ceramic ferrule layers and the ceramic ferrules can be changed according to actual needs.

The positioning member 40 has a substantially circular cross-section. Each of the positioning members 40 is located between two adjacent ceramic ferrule layers, and each positioning member 40 simultaneously abuts two adjacent ceramic ferrules 31 of each adjacent ceramic ferrule layer. Specifically, opposite sides of the positioning member 40 respectively abut the outer surfaces of two adjacent ceramic ferrules 31 of the adjacent two ceramic ferrule layers 30.

In one embodiment, a center of each positioning member 40 is symmetrically located between the adjacent two ceramic ferrules 31 of the adjacent two ceramic ferrule layers.

Opposite sides of the ceramic ferrule array 30 respectively abut the first groove wall 111 and the second groove wall 112, and each positioning member 40 abuts two adjacent ceramic ferrules 31 of two adjacent ceramic ferrule layers to fix the ceramic ferrules 31. The optical fiber array device 100 has a simple structure, low production cost, and good optical signal transmission quality.

Figure 3:
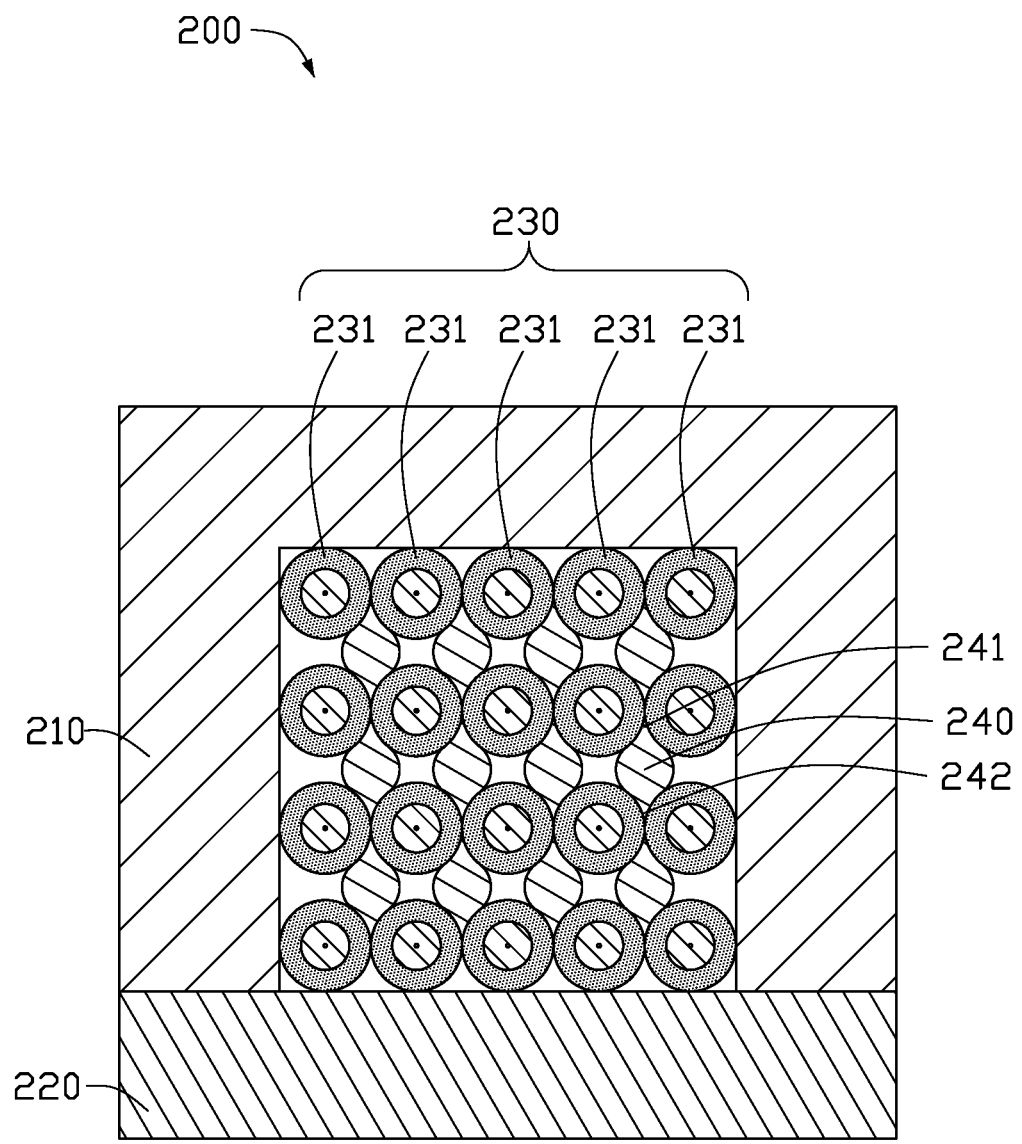
FIG. 3 is a cross-sectional view of another embodiment of an optical fiber array device.

FIG. 3 shows an embodiment of an optical fiber array device 200 including a substrate 210, a cover plate 220, a ceramic ferrule array 230, and positioning members 240. The ceramic ferrule array 230 includes a plurality of ceramic ferrules 231 arranged in a plurality of ceramic ferrule layers. The substrate 210, the cover plate 220, and the ceramic ferrule array 230 are substantially similar in structure to the substrate 10, the cover 20, and the ceramic ferrule array 30 in the optical fiber array device 100. The positioning member 240 includes a first contoured portion 241 and a second contoured portion 242. The first contoured portion 241 and the second contoured portion 242 are respectively located on opposite sides of the positioning member 40. The first contoured portion 241 and the second contoured portion 242 each conform to a shape of a gap between outer surfaces of the two adjacent ceramic ferrules 231.

In other embodiments, a gap exists between adjacent ceramic ferrules 31 in each ceramic ferrule layer.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An optical fiber array device comprising:
a substrate;
a cover plate; and
a ceramic ferrule array; wherein:
a receiving groove is defined in one surface of the substrate;
the substrate and the cover plate are coupled together and cooperatively cover the receiving groove;
the receiving groove comprises a first groove wall and a second groove wall;
the ceramic ferrule array comprises at least one layer of ceramic ferrules and a plurality of positioning members;
opposite sides of the at least one layer of ceramic ferrules respectively abut the first groove wall and the second groove wall; and
each of the plurality of positioning members is located between two adjacent ceramic ferrules, one side of each of the plurality of positioning members abuts against two adjacent ceramic ferrules.

2. The optical fiber array device of claim 1, wherein:
the ceramic ferrule array comprises one layer of a plurality of ceramic ferrules;
the receiving groove further comprises a bottom wall perpendicularly coupled to the first groove wall and the second groove wall;
the one layer of the plurality of ceramic ferrules abuts against the bottom wall; and
another side of each of the plurality of positioning members abuts against the bottom wall.

3. The optical fiber array device of claim 1, wherein:
the ceramic ferrule array comprises a plurality of layers of ceramic ferrules stacked in the receiving groove;
the receiving groove further comprises a bottom wall perpendicularly coupled to the first groove wall and the second groove wall;
one layer of ceramic ferrules of the ceramic ferrule array abuts against the bottom wall, and another layer of ceramic ferrules of the ceramic ferrule array abuts against the cover plate;
each of the plurality of positioning members is located between two adjacent layers of ceramic ferrules; and
each of the plurality of positioning members abuts against two adjacent ceramic ferrules of the two adjacent layers of ceramic ferrules.

4. The optical fiber array device of claim 3, wherein:
each of opposite sides of each of the plurality of positioning members abuts against an outer surface of two adjacent ceramic ferrules of the corresponding adjacent layer of ceramic ferrules.

5. The optical fiber array device of claim 3, wherein:
each of the plurality of positioning members includes a first contoured portion and a second contoured portion;
the first contoured portion and the second contoured portion are respectively located on opposite sides of the positioning member;
the first contoured portion and the second contoured portion each conform to a shape of a gap between outer surfaces of the corresponding two adjacent ceramic ferrules.

6. The optical fiber array device of claim 3, wherein:
a center of each ceramic ferrule in each ceramic ferrule layer is aligned with a center of at least one ceramic ferrule in another ceramic ferrule layer.

7. The optical fiber array device of claim 3, wherein:
a gap is defined between adjacent layers of ceramic ferrules.

8. The optical fiber array device of claim 1, wherein:
a gap is defined between adjacent ceramic ferrules of each layer of ceramic ferrules.

9. The optical fiber array device of claim 1, wherein:
each of the ceramic ferrules in each layer of ceramic ferrules abuts against adjacent ceramic ferrules.

10. The optical fiber array device of claim 9, wherein:
a center of each positioning member is symmetrically located between the adjacent two ceramic ferrules of the adjacent two ceramic ferrule layers.

11. An optical fiber array comprising:
at least one layer of ceramic ferrules; and
a plurality of positioning members; wherein:
each of the plurality of positioning members is located between two adjacent ceramic ferrules, one side of each of the plurality of positioning members abuts against two adjacent ceramic ferrules.

12. The optical fiber array of claim 11, wherein:
the ceramic ferrule array comprises a plurality of layers of ceramic ferrules stacked;
each of the plurality of positioning members is located between two adjacent layers of ceramic ferrules; and
each of the plurality of positioning members abuts against two adjacent ceramic ferrules of the two adjacent layers of ceramic ferrules.

13. The optical fiber array of claim 12, wherein:
each of opposite sides of each of the plurality of positioning members abuts against an outer surface of two adjacent ceramic ferrules of the corresponding adjacent layer of ceramic ferrules.

14. The optical fiber array of claim 13, wherein:
a center of each ceramic ferrule in each ceramic ferrule layer is aligned with a center of at least one ceramic ferrule in another ceramic ferrule layer.

15. The optical fiber array of claim 13, wherein:
a gap is defined between adjacent layers of ceramic ferrules.

16. The optical fiber array of claim 12, wherein:
each of the plurality of positioning members includes a first contoured portion and a second contoured portion;
the first contoured portion and the second contoured portion are respectively located on opposite sides of the positioning member;
the first contoured portion and the second contoured portion each conform to a shape of a gap between outer surfaces of the corresponding two adjacent ceramic ferrules.

17. The optical fiber array of claim 11, wherein:
a gap is defined between adjacent ceramic ferrules of each layer of ceramic ferrules.

18. The optical fiber array of claim 11, wherein:
each of the ceramic ferrules in each layer of ceramic ferrules abuts against adjacent ceramic ferrules.

19. The optical fiber array of claim 18, wherein:
a center of each positioning member is symmetrically located between the adjacent two ceramic ferrules of the adjacent two ceramic ferrule layers.

* * * * *